Sept. 2, 1952 — E. MEIDINGER — 2,608,925
CULTIVATOR
Filed June 6, 1950 — 4 Sheets-Sheet 1

INVENTOR.
Edwin Meidinger,
BY Victor J. Evans & Co.
ATTORNEYS

Sept. 2, 1952                    E. MEIDINGER                    2,608,925
                                   CULTIVATOR
Filed June 6, 1950                                           4 Sheets-Sheet 2
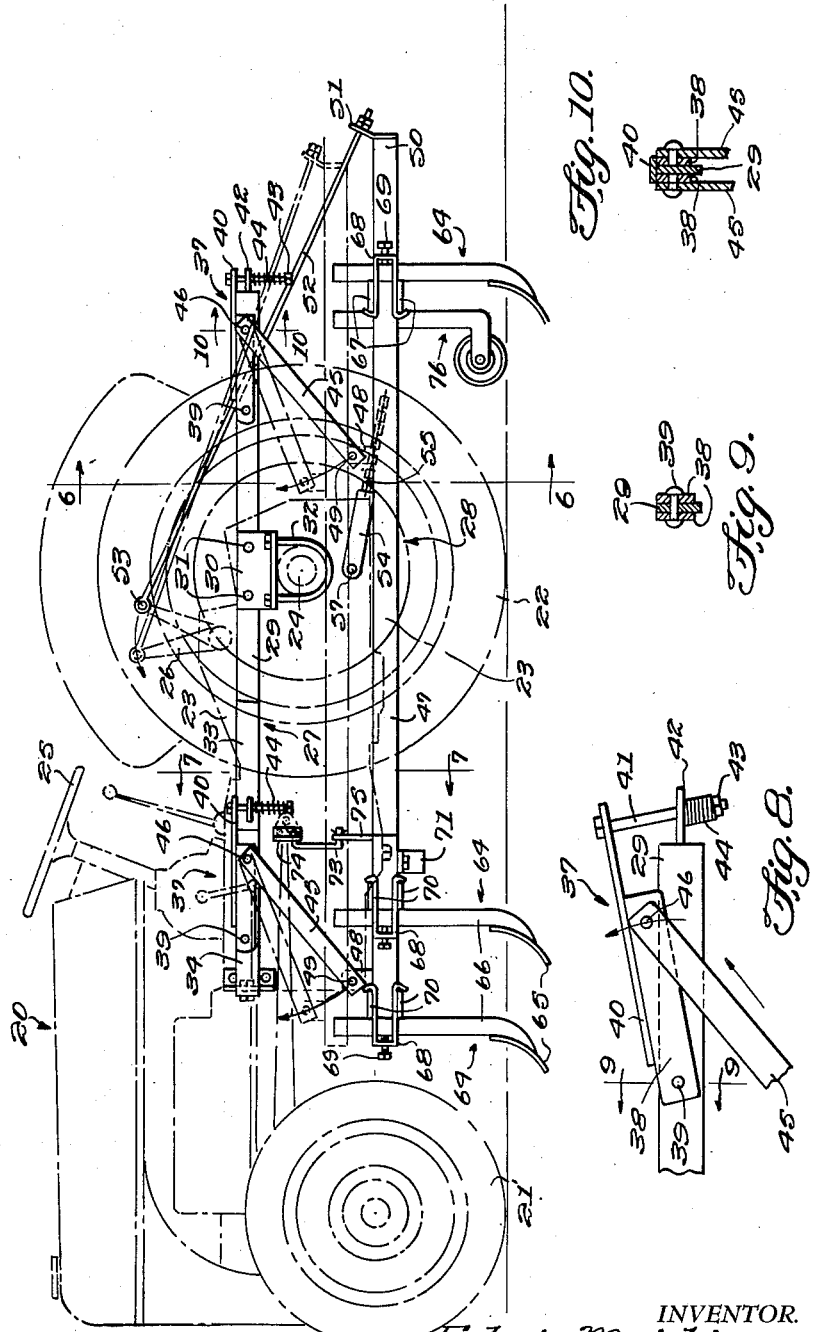
INVENTOR.
*Edwin Meidinger,*
BY *Victor J. Evans & Co.*
ATTORNEYS

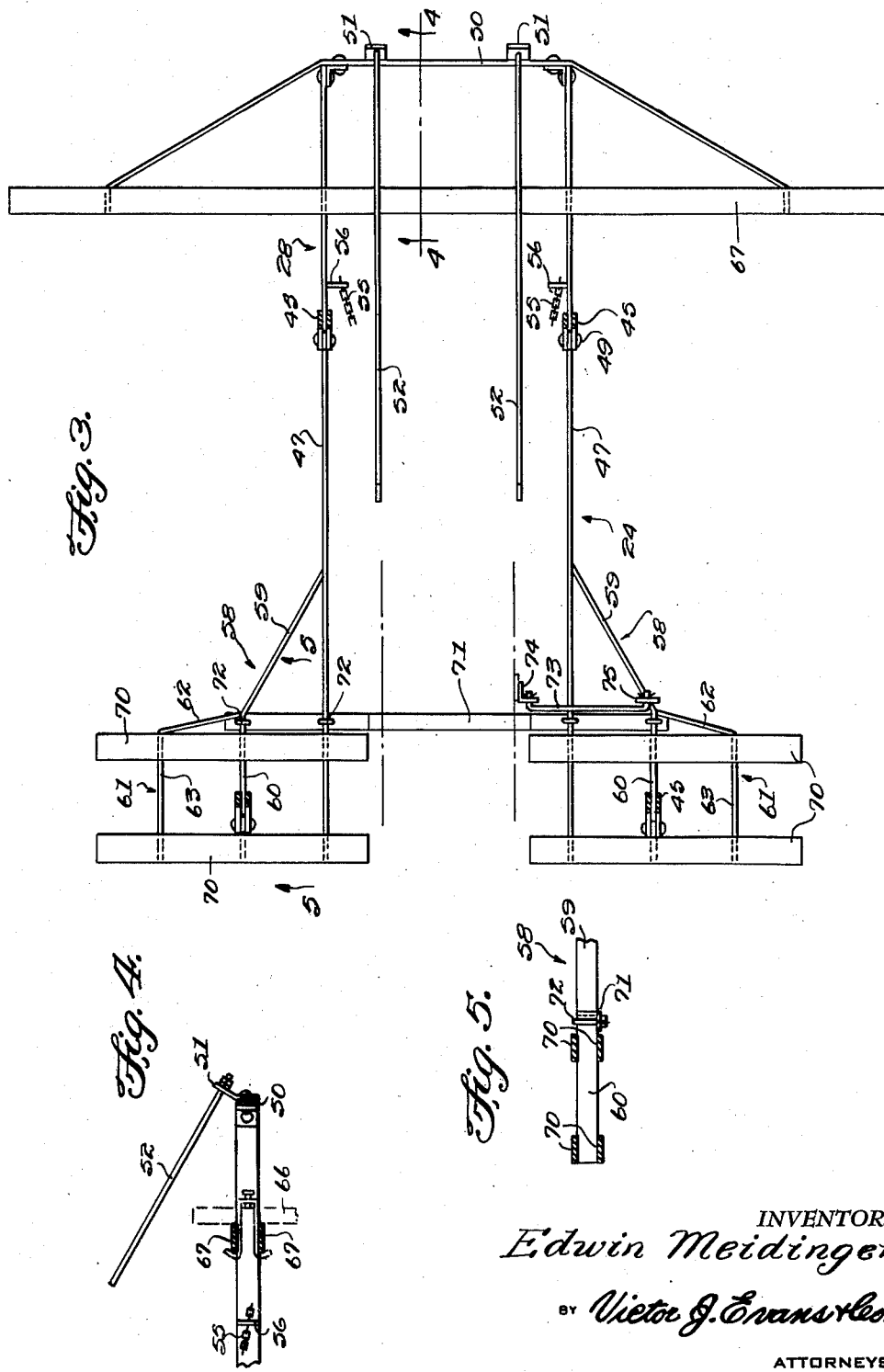

Sept. 2, 1952     E. MEIDINGER     2,608,925
CULTIVATOR
Filed June 6, 1950     4 Sheets-Sheet 4
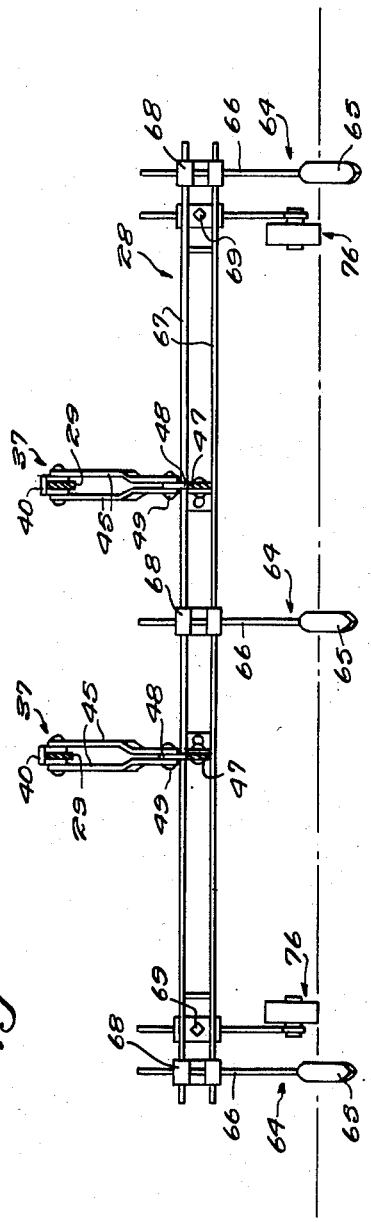
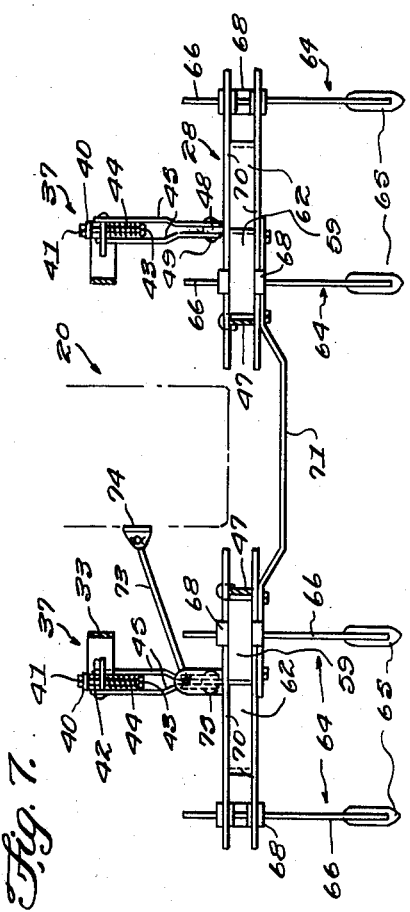
INVENTOR.
*Edwin Meidinger,*
BY *Victor J. Evans & Co.*
ATTORNEYS Patented Sept. 2, 1952

2,608,925

UNITED STATES PATENT OFFICE 2,608,925

CULTIVATOR

Edwin Meidinger, Lethbridge, Alberta, Canada

Application June 6, 1950, Serial No. 166,327

2 Claims. (Cl. 97—47)

This invention relates to agricultural equipment, and more particularly to a cultivator for attachment to a tractor.

The object of the invention is to provide a cultivator for attachment to a tractor, whereby the operator can clearly observe the rows and plants being worked, the cultivator including a plurality of ground-working tools that can be moved into and out of engagement with the ground.

Another object of the invention is to provide a cultivator which is adapted to be readily attached to a conventional tractor, the cultivator of the present invention being constructed so that the tools of the cultivator will automatically be pulled into the ground after the power lift has been dropped and as the tractor moves forwardly along the field.

Still another object of the invention is to provide a tractor cultivator which can be adjusted so as to vary the depth that the tools move into the ground, the cultivator including a plurality of spring assemblies that serve to prevent the tools from penetrating too deeply into the ground in the event that the rear wheels of the tractor accidentally drop into a hole or ditch.

A further object of the invention is to provide a tractor cultivator which is extremely simple and inexpensive to manufacture.

Other objects and advantages will be apparent during the course of the following description.

In the accompanying drawings forming a part of this application, and in which like numerals are used to designate like parts throughout the same:

Figure 2 is a side elevational view of the assembly of Figure 1, showing in solid lines the lowered operative position of the cultivator, and showing in broken lines the raised position of the cultivator;

Figure 3 is a top plan view of the main frame with the tools removed;

Figure 4 is a sectional view taken on the line 4—4 of Figure 3;

Figure 5 is a sectional view taken on the line 5—5 of Figure 3;

Figure 6 is a sectional view taken on the line 6—6 of Figure 2;

Figure 7 is a sectional view taken on the line 7—7 of Figure 2;

Figure 8 is an enlarged side elevational view of one of the spring assemblies;

Figure 9 is a sectional view taken on the line 9—9 of Figure 8;

Figure 10 is a sectional view taken on the line 10—10 of Figure 2.

Figure 1:
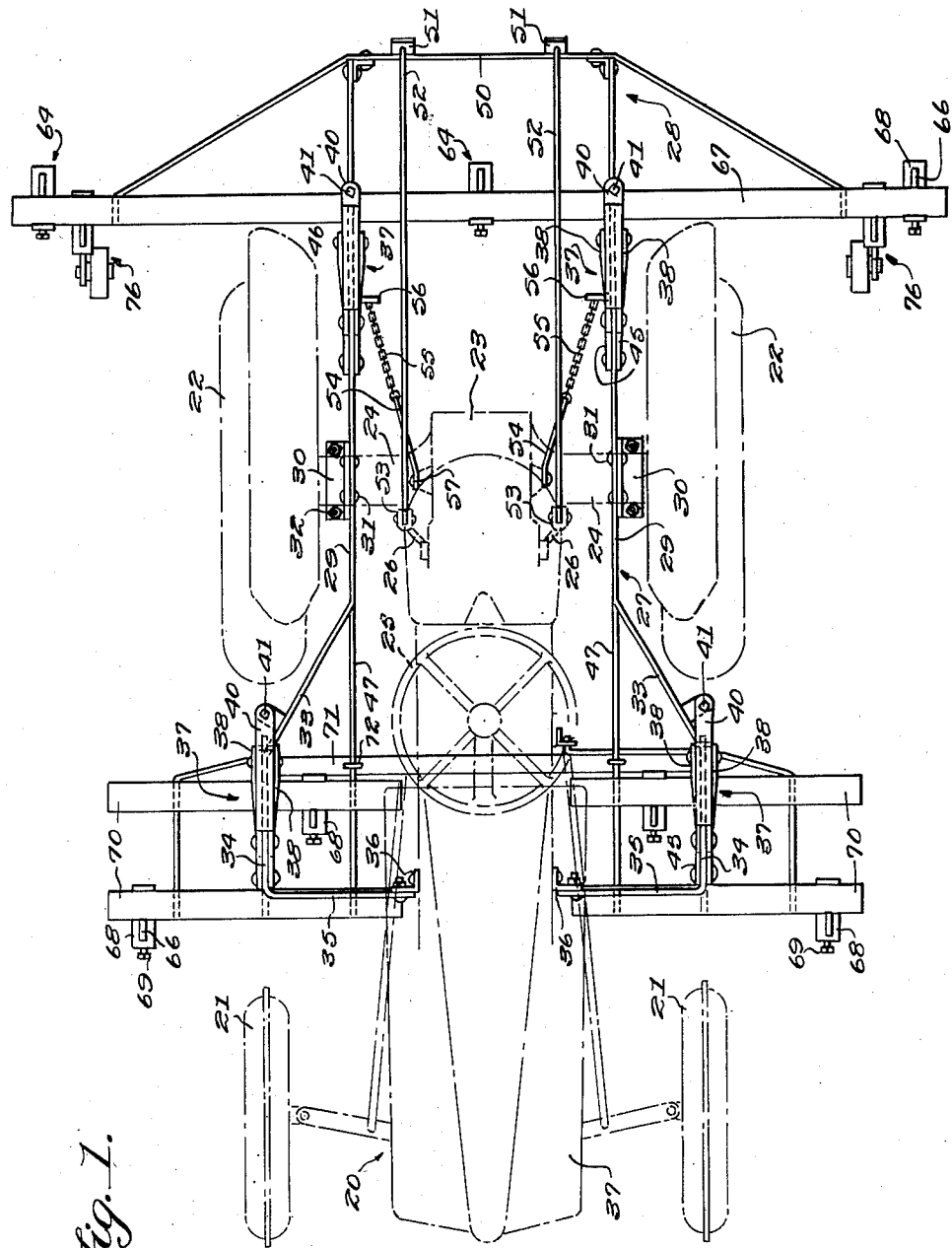
Figure 1 is a top plan view of the cultivator of the present invention shown attached to a conventional tractor, the tractor being shown in broken lines.

Referring in detail to the drawings, the numeral 20 designates a conventional tractor, broken lines Figures 1 and 2, and the tractor 20 includes front wheels 21 and rear wheels 22. The tractor 20 further includes a transmission casing 23 and axle housing 24 extending from the transmission casing 23. The tractor is further provided with a conventional steering wheel 25. Pivotally connected to the transmission casing 23 is a pair of power lift arms 26 and the arms 26 are adapted to be swung in a counterclockwise direction in the usual manner, when the tractor operator desires to raise the tools of the cultivator out of engagement with the ground.

The cultivator of the present invention includes a frame support 27 which is secured rigidly to the tractor, and arranged below the frame support 27 is a main frame 28 which can be raised and lowered, as later described in this application.

The frame support 27 comprises a pair of horizontally disposed, spaced straps 29, and the straps 29 extend longitudinally along the tractor. For securing the straps 29 to the tractor, a bracket 30 is secured to each of the straps 29 by suitable securing elements, such as rivets 31. A U-bolt 32, Figure 2, connects each of the brackets 30 to the axle housing 24. Also, each of the straps 29 includes an offset portion 33 that terminates in a straight portion 34, and the straight portion 34 terminates in a transverse portion 35. A small bracket 36 serves to secure the free end of the transverse portion 35 to the engine housing 37 of the tractor 20. Thus, it will be seen that the frame support 27 is rigidly secured to the tractor.

A pair of spring assemblies 37 are arranged on each of the straps 29. Thus, it will be seen that one of the spring assemblies 37 is arranged on the rear end of each of the straps 29, and also, one of the spring assemblies 37 is arranged adjacent to the front end of each of the straps 29. By providing the spring assemblies 37, the tools of the cultivator will be prevented from penetrating too deeply into the ground in the event that one of the rear wheels 22 of the tractor drops into a hole or ditch, or in the event a hard object is encountered by one of the tools. The detailed construction of the spring assemblies 37 will be explained later in this application.

Each of the spring assemblies 37 includes a pair of rectangular plates 38 that are arranged on opposite sides of the straps 29, and one end of each of the plates 38 is pivotally connected to the straps 29 by a pin 39, Figures 8 and 9. Secured to the upper surface of the pair of plates 38 is a strip 40, one end of the strip 40 projecting beyond the free end of the plate 38. A stub shaft or bolt 41 has its upper end connected to the projecting end of the strip 40, and the stub shaft 41 slidably projects through an ear 42, the ear 42 being secured to the strap 29. A nut 43 is arranged in threaded engagement with the lower end of the shaft 41, and a coil spring 44 is circumposed on the shaft 41, the coil spring 44 being interposed between the ear 42 and the nut 43. The coil spring 44 normally urges the plates 38 in a clockwise direction, Figure 8. A link 45 has its upper end pivotally connected to one of the plates 38 by a pin 46, and it will be seen that a pair of the links 45 are provided for each of the spring assemblies 37. The lower ends of the links 45 are pivotally connected to the main frame 28, as later described in this application.

The main frame 28 includes a pair of horizontally disposed beams 47 which are arranged in spaced relation with respect to each other and extend longitudinally below the straps 29. Secured to each of the beams 47 are vertically disposed lugs 48, and the lower ends of the links 45 are pivotally connected to the lugs 48 by a pin 49, Figures 2 and 3. This arrangement permits any of the spring assemblies 37 to have their parts moved from the position shown in Figure 2 to the position shown in Figure 8, in the event that one of the rear wheels drops into a hole, or in the event that an object is encountered by one of the tools, so that the tools will be prevented from penetrating too deeply into the ground.

Extending between the rear ends of the beams 47 and secured thereto is a horizontally disposed brace member 50. Projecting upwardly from the intermediate portion of the brace member 50 and secured thereto is a pair of lugs 51, and an actuating rod 52 has its rear end connected to each of the lugs 51. The upper or forward end of each of the actuating rods 52 is pivotally connected to one of the power lift arms 26 by a pin 53, Figure 2. Thus, when the power lift arms 26 are swung or turned in a counterclockwise direction, the main frame 28 will be raised or moved from the solid line position of Figure 2 to the dotted line position of Figure 2, so that the cultivating tools can be moved out of engagement with the ground. When the power lift arms 26 are released, the main frame 28 will return to the solid line position shown in Figure 2, so that the forward movement of the tractor 20 will cause the cultivator tools to dig into the ground.

The body member 54 is pivotally connected to each side of the transmission casing 23 by a pin 57, and a chain 55 has its front end connected to each of the body members 54. The rear end of each of the chains 55 is detachably connected to an ear 56 which projects inwardly from each of the beams 47. The length of the chain 55 can be changed as desired, whereby the depth of penetration of the cultivator tools into the ground can be varied.

Secured to each of the beams 47 adjacent the front end thereof is a support member 58. Each of the support members 58 includes an inclined section 59 which has its rear end secured to the beam 47, as by welding, and the support member 58 further includes a straight section 60. Secured to each of the support members 58 is a frame piece 61. Each of the frame pieces 61 includes an inclined section 62 which has its rear end secured, as by welding to the support member 58, Figure 3, and also, each of the frame pieces 61 includes a straight section 63.

The cultivator of the present invention further includes a plurality of spaced ground-working tools 64. Each of the tools 64 includes a shovel 65 that is secured to the lower end of a vertically disposed shank or stem 66. Arranged transversely or at right angles with respect to the rear ends of the beams 47 and secured thereto, as by welding, is a pair of horizontally disposed, spaced, parallel bars 67, Figure 6. These two bars 67 provide a support for some of the ground-working tools 64. For detachably connecting each of the tools 64 to the pair of bars 67, a clamp 68 is provided, Figure 2, and a set screw 69 projects through each of the clamps 68 for maintaining the tool 64 connected to the bars 67.

A means is provided for supporting a plurality of the tools 64 on the front end of the main frame 28. This means comprises a plurality of horizontally disposed, spaced, parallel, short bars 70, Figures 3 and 7. It will be seen that the short bars 70 are arranged in pairs one above the other, and the clamps 68 are again provided for detachably connecting the tools 64 to the bars 70. The bars 70 extend along the top and bottom edges of the beam 47, straight section 60 and straight section 63, and are secured to the latter, as by welding.

Extending below the front portions of the pair of beams 47 is a stabilizer member 71. The stabilizer member 71 is secured to the beams 47 by suitable securing elements, such as bolts 72, and the ends of the stabilizer member 71 are secured to the support member 58 by similar bolts 72. The stabilizer member 71 helps to maintain the parts of the main frame in their proper spaced relation. For helping to prevent swaying of the main frame 28, a tie rod 73 has its upper end pivotally connected to a bracket 74, Figures 2 and 3, and the bracket 74 is secured to one side of the tractor 20. The lower end of the tie rod 73 is pivotally connected to the upper end of an arm 75, the lower end of the arm 75 being connected to the piece 59 that extends along the left side of the tractor 20. Gauge wheels 76 are connected to the bars 67, Figures 1 and 2, and the gauge wheels 76 are adapted to roll along the ground when the main frame 28 is in its lowered or operative position.

In use, when the cultivator of the present invention is being used, the parts are in the solid line position shown in Figure 2. When the cultivator is not being used, it is moved to the dotted line position of Figure 2. To raise the main frame 28 from the solid line position of Figure 2 to the dotted line position, the power lift arms 26 are actuated or pivoted in a counterclockwise direction, and this causes the main frame 28 to be raised, since the rods 52 connect the power lift arms 26 to the rear end of the main frame 28. To lower the main frame 28, which carries the cultivator tools, the power lift arms 26 are simply released. Then, when the tractor 20 moves forwardly along the field to be cultivated, the shovel 65 of the tools 64 will dig into the ground so that finally the chains 55 will be pulled tight. The chains 55 will limit the depth of cutting of the tools 64 and by varying the length of the chains 55, the depth of cutting can be controlled as desired.

The spring assemblies 37 insure that the main frame 28 will remain at a constant level, even though one of the rear wheels may enter a ditch or hole, or even though an obstacle may be encountered by one of the tools. Thus, if one of the rear wheels 22 of the tractor engages a hole, the parts of the spring assembly can move from the position shown in Figure 2 to the position shown in Figure 8. The links 45 can pivot or move relative to the straps 29, so as to compensate for the uneven ground, and the coil springs 44 tend to normally urge the parts of the spring assemblies in the position shown in Figure 2.

The cultivator of the present invention is adapted to be used for various makes and sizes of tractors. When using the cultivator, the tractor operator has clear vision to the rows and plants being worked. The cultivator of the present invention is constructed so that no pressure is required to force the tools into the ground. This is advantageous, because many tractors are not equipped with means for causing such a downward pressure. Thus, with the cultivator of the present invention, the forward motion of the tractor pulls the cultivator into the ground after the power lift arms have been dropped, and the cultivator tools will keep going into the ground until the chains 55 are tight, and then the entire pull will be from these chains 55. The spring assemblies 37 enable the cultivator to maintain constant depth, even when uneven ground is encountered.

I claim:

1. In combination, a tractor including an axle housing, and power lift arms, a cultivator operatively connected to said tractor and including a frame support secured to said tractor, a main frame operatively connected to said frame support, said frame support comprising a pair of spaced parallel horizontally disposed straps secured to said tractor, a spring assembly mounted on each end of each of said straps, said main frame comprising a pair of spaced parallel beams arranged below said straps, a brace member extending between the rear ends of said beams and secured thereto, a pair of spaced parallel inclined rods connecting said brace member to said power lift arms, and a plurality of links pivotally connecting said beams to said spring assemblies, said spring assemblies each comprising a pair of plates arranged on opposite sides of said straps and pivotally connected thereto, the upper ends of said links being pivotally connected to said plates, a strip secured to the upper surface of each pair of plates, a stub shaft having its upper end connected to the projecting end of said strip, an ear projecting from said strap, said stub shaft slidably engaging said ear, and a coil spring circumposed on said stub shaft and engaging said ear.

2. In combination, a tractor including an axle housing and power lift arms, a cultivator operatively connected to said tractor and including a frame support secured to said tractor, a main frame operatively connected to said frame support, said frame support comprising straps secured to said tractor, a spring assembly mounted on each end of each of said straps, said main frame comprising beams arranged below said straps, a brace member extending between the rear ends of said beams and secured thereto, a pair of rods connecting said brace member to said power lift arms, and a plurality of links pivotally connecting said beams to said spring assemblies, said spring assemblies each comprising plates arranged on opposite sides of said straps and pivotally connected thereto, said links being pivotally connected to said plates, a strip secured to the upper surface of each pair of plates, a stub shaft having its upper end connected to the projecting end of said strip, an ear projecting from said straps, said stub shaft slidably engaging said ear, and a coil spring circumposed on said stub shaft and engaging said ear.

EDWIN MEIDINGER.

REFERENCES CITED

The following references are of record in the file of this patent:

UNITED STATES PATENTS

| Number | Name | Date |
|---|---|---|
| 933,687 | Arthur | Sept. 7, 1909 |
| 1,321,551 | Potter | Nov. 11, 1919 |
| 1,906,431 | Strehlow | May 2, 1933 |
| 2,247,367 | Frudden et al. | July 1, 1941 |
| 2,341,417 | Atchison | Feb. 8, 1944 |
| 2,371,839 | Orelind | Mar. 20, 1945 |